US011831522B2

(12) United States Patent
Grace

(10) Patent No.: US 11,831,522 B2
(45) Date of Patent: Nov. 28, 2023

(54) INTELLIGENT WIRELESS BROADBAND NETWORK AND CONTENT DELIVERY MANAGEMENT

(71) Applicant: Element8 Technology Investment Group Inc., Fort Worth, TX (US)

(72) Inventor: Kevin Michael Grace, Fort Worth, TX (US)

(73) Assignee: Element8 Technology Investment Group Inc., Forth Worth, TX (US)

( * ) Notice: Subject to any disclaimer, the term of this patent is extended or adjusted under 35 U.S.C. 154(b) by 0 days.

(21) Appl. No.: 17/380,230

(22) Filed: Jul. 20, 2021

(65) Prior Publication Data

US 2023/0029018 A1  Jan. 26, 2023

(51) Int. Cl.
| | |
|---|---|
| *H04L 41/5054* | (2022.01) |
| *H04L 67/50* | (2022.01) |
| *H04W 24/02* | (2009.01) |
| *H04L 41/16* | (2022.01) |
| *H04L 41/50* | (2022.01) |
| *H04L 12/10* | (2006.01) |
| *H04W 16/00* | (2009.01) |

(52) U.S. Cl.
CPC .......... *H04L 41/5054* (2013.01); *H04L 12/10* (2013.01); *H04L 41/16* (2013.01); *H04L 41/5077* (2013.01); *H04L 67/535* (2022.05); *H04W 24/02* (2013.01); *H04W 16/00* (2013.01)

(58) Field of Classification Search
None
See application file for complete search history.

(56) References Cited

U.S. PATENT DOCUMENTS

| | | | | |
|---|---|---|---|---|
| 2011/0145887 | A1* | 6/2011 | Morovitz | H04N 21/44008 726/3 |
| 2015/0244771 | A1* | 8/2015 | Pasdar | H04L 67/10 709/217 |
| 2020/0235607 | A1* | 7/2020 | Kanarellis | H04B 7/18597 |
| 2020/0389808 | A1* | 12/2020 | Wong | H04W 28/0236 |

(Continued)

OTHER PUBLICATIONS

"Rise Broadband Uses Mimosa by Airspan to Deploy High-Speed Broadband", Mimosa website, Jan. 26, 2021 [retrieved on Aug. 26, 2022]. Retrieved from the Internet: <URL: https://mimosa.co/news/rise-broadband-partners-with-mimosa-to-deploy-high-speed-broadband> (Year: 2021).*

(Continued)

*Primary Examiner* — Kevin T Bates
*Assistant Examiner* — Dae Kim
(74) *Attorney, Agent, or Firm* — Schott, P.C.

(57) ABSTRACT

An intelligent wireless broadband network and content delivery management within a network includes at least one datacenter, at least one network tower and a plurality of smart nodes may be provided. Each of the plurality of smart nodes may be deployed as a micro point of presence (micro POP) at the at least one datacenter the at least one tower and at each of a plurality of hub-homes within the network. An artificial intelligence (AI) capable compute unit may be configured to provide customization of the plurality of smart nodes based on usage pattern of the plurality of homes at a neighborhood level, and thereby facilitating a dynamic edge network distribution solution for better Internet experience to the end-users.

14 Claims, 6 Drawing Sheets

(56) References Cited

U.S. PATENT DOCUMENTS

2021/0076001 A1* 3/2021 Periyannan ........... H04L 63/029

OTHER PUBLICATIONS

Allman, Mark. "Rethinking Home Networking for the Ultrabroadband Era", archive.org, Jun. 17, 2021 [retrieved on Aug. 27, 2022]. Retrieved from the Internet: <URL: https://web.archive.org/web/20210617220618/https://www.icsi.berkeley.edu/icsi/projects/networking/rethinking-home-networking>. (Year: 2021).*

Haidine et al. "Aritifical Intelligence and Machine Learning in 5G and beyond: A Survey and Perspectives", IntechOpen.com, Jul. 5, 2021 [retrieved on Aug. 27, 2022]. DOI: 10.5772/intechopen.98517. (Year: 2021).*

Jiang et al. "AI-Enabled Next-Generation Communication Networks: Intelligent Agent and AI Router", IEEE Wireless Comm'ns, vol. 27 Iss. 6, Dec. 2020, pp. 129-133. DOI: 10.1109/MWC.001.2000100. (Year: 2020).*

* cited by examiner ated by the datacentres 108, as other than the datacenters 108, there are no intelligent nodes deployed anywhere in the network 100 that can make any change in the data traffic and provide fast and effective solution as required. The nodes present in the centralized network 100 thus function as 'observers' which may take in information for future planning, but cannot make any changes in the traffic route or push updates down into network 100 from the datacentres 108.

INTELLIGENT WIRELESS BROADBAND NETWORK AND CONTENT DELIVERY MANAGEMENT

FIELD OF THE DISCLOSURE

The present invention relates to broadband system architectures and more particularly to implementation of intelligent wireless broadband systems and methods for providing better Internet experience to end users.

BACKGROUND OF THE DISCLOSURE

Broadband system architectures primarily use Transmission Control Protocol (TCP) together with the Internet Protocol (IP) to ensure correct transmission of data packets between a client and server. Traditional TCP was not initially designed for wireless connections. Therefore, the base protocol has inefficiencies that make all wireless connections have an increased overhead for packet re-transmissions. These inherent limitations on TCP encoding have a major effect on how data is delivered, and how much data is delivered.

Existing Internet Service Providers (ISPs) competitors are captive to strict ROI guidelines that ensure there is a focus on the deployment of new services into the urban core. Given the cost of their new technology deployments, servicing exurban customers is not profitable. This means homes and commercial spaces worth >$1M are left with lackluster connectivity and are still being served by some combination of DSL, cellular providers, and satellite internet. There is required a cost-effective solution that can be deployed in rural or exurban areas, and facilitate the service providers to deliver next-generation internet experience to end-users.

Further, in the traditional broadband architecture, the existing POPs (Points of Presence) used by ISPs (Internet Service Providers) are not localized to end-users. Edge computing, despite its suggested definition, primarily exists as a 'centralized' solution for the service and content providers. The centralized solution provides no redundancy to cater any breakdown or sudden failure of the system due to any technical issues, natural calamities, or any other crisis. Based on this standard solution, a limited amount of optimization can occur from the point of presence to the user. Many content distribution systems are designed for macro-content across an entire segment of the network. Moreover, content providers do not have the flexibility to optimize and serve their content effectively through the service providers' network. Due to lack of optimization facility, a content provider may incur additional expenses in bandwidth or computing resources.

FIG. 1 illustrates a traditional ISP architecture 100, a centralized network system which is typically configured to handle aggregated level of data from 100k or even more households 102. In the traditional ISP architecture 100, the service providers (SP) 106 are the observers, that merely perform deep packet data inspection (DPI) for the large volume of data. However, such a system lacks the visibility of customers or end-users at a smaller level, for example, 'fewer number of households at a neighborhood level'. This means that although the centralized system may be capable of handling large data at a larger community level, it is not capable of managing and serving its customers at smaller neighbourhood levels due to lack of visibility at the neighborhood levels. The service providers 106 associated to the traditional ISP architectures provide their services from the datacentres (DC) 108 to end-users in only one direction. Any optimization pursuant to customers' requests is carried only by the datacentres 108, as other than the datacenters 108, there are no intelligent nodes deployed anywhere in the network 100 that can make any change in the data traffic and provide fast and effective solution as required. The nodes present in the centralized network 100 thus function as 'observers' which may take in information for future planning, but cannot make any changes in the traffic route or push updates down into network 100 from the datacentres 108.

In view of the above, the present invention as disclosed herein, aims to provide a novel system, apparatus and method for providing intelligent broadband network and content delivery management.

SUMMARY OF THE DISCLOSURE

In order to provide a holistic solution to the above-mentioned limitations, it is necessary to deploy a proactive and intelligent network solution that is also capable of providing a dynamic content delivery management.

An object of the present disclosure is to deploy a decentralized broadband network architecture to create multiple redundancy via smart nodes so that there is no 'single point of failure'.

An object of the present disclosure is to provide AI (Artificial Intelligence) capable GPUs (Graphics Processing Units) at every point in the network architecture.

An object of the present disclosure is to facilitate the service providers with a two-way information flow between a datacentre and the network.

An object of the present disclosure is to provide visibility of end-users both at community level and neighborhood level.

An object of the present disclosure is to configure a smart and proactive broadband network architecture capable of facilitating Over-the-Air (OTA) updates.

An object of the present disclosure is to provide a combination of un-interruptible power supply, AI capable compute, storage, high-speed connectivity, and smart software component at each node to enable independent and automated orchestration of the entire network architecture.

An object of the present disclosure is to facilitate the service providers to provide more capacity, lower latency, and true personalization to the end-users.

Another object of the present disclosure is to reduce transmission costs.

According to an embodiment of the present disclosure, there is provided a broadband network system comprising: at least one network tower; at least one datacenter; and a plurality of smart nodes, each smart node configured to integrate one or more components including an artificial intelligence (AI) capable compute and a smart module; wherein each smart node is deployed as a micro point of presence (micro POP) at: the at least one tower, the at least one datacenter, and each of a plurality of hub-homes, the plurality of hub-homes belonging to at least one neighborhood, the at least one neighborhood belonging to a community of end-users, and wherein the artificial intelligence (AI) capable compute unit and the smart module are configured to: provide customization of the plurality of smart nodes based on usage pattern of corresponding at least one neighborhood, decentralize edge network distribution from the at least one datacenter to the end-users of the corresponding at least one neighborhood, and thereby deliver personalized Internet experience to the end-users.

According to an embodiment of the present disclosure, the broadband network is a decentralized wireless broadband network providing multiple redundancy within the network via the micro POPs.

According to an embodiment of the present disclosure, each smart node is configured to provide a two-way network information flow between at least one datacenter and the plurality of hub-homes.

According to an embodiment of the present disclosure, the smart module comprises a decoder, an encoder, an intelligent content and service engine.

According to an embodiment of the present disclosure, the broadband network is capable of identifying large and small volume of data flow at community level and neighborhood level respectively.

According to an embodiment of the present disclosure, the broadband network is configured to allow Over-the-Air (OTA) updates.

According to an embodiment of the present disclosure, the broadband network is configured to allow effective management without human intervention.

According to an embodiment of the present disclosure, the deployment of each smart node at the at least one tower, at the at least one datacenter and at each of a plurality of hub-homes, facilitates in providing more capacity, lower latency, content optimization and personalization to the end-users.

According to an embodiment of the present disclosure, the one or more components of the smart node further include a storage unit, a decoder encoder unit, an un-interruptible power supply (UPS) and a Power Over Ethernet (POE) power supply.

According to an embodiment of the present disclosure, the storage unit stores relevant content for facilitating customized and personalized services to the end-users.

In an embodiment of the present disclosure, a method for providing a broadband network comprises: configuring at least one network tower; configuring at least one datacenter; configuring a plurality of smart nodes, each smart node is configured by integrating: one or more components including an artificial intelligence (AI) capable compute and a smart module; deploying each smart node as a micro point of presence (micro POP) at the at least one tower, at the at least one datacenter and at each of a plurality of hub-homes, the plurality of hub-homes belonging to at least one neighborhood, the at least one neighborhood belonging to a community of end-users; configuring the artificial intelligence (AI) capable compute unit for: providing customization of the plurality of smart nodes based on usage pattern of corresponding at least one neighborhood, decentralizing edge network distribution from the at least one datacenter to the end-users of the corresponding at least one neighborhood, and thereby facilitating a dynamic edge network distribution and delivering personalized Internet experience to respective end-users.

In an embodiment of the present disclosure, an apparatus comprising one or more components is provided. The one or more components of the apparatus include: an artificial intelligence (AI) capable compute unit, a smart module, a storage unit, a decoder-encoder unit, an un-interruptible power supply (UPS) and a Power Over Ethernet (POE) power supply, wherein the one or more components are integrated together inside an enclosure to enable the apparatus to operate as a smart node upon being installed as micro points of presence (micro POP) in a broadband network.

According to an embodiment of the present disclosure, the encoder-decoder unit is configured to handle data compression and necessary network protocols.

According to an embodiment of the present disclosure, the un-interruptible power supply (UPS) and the Power Over Ethernet (POE) power supply provide continuous supply of power to enable the apparatus to operate.

According to an embodiment of the present disclosure, the apparatus is installed at one or more physical locations in the broadband network, the one or more physical locations includes: at least one tower, at least one datacenter, and each of a plurality of hub-homes, the plurality of hub-homes belonging to at least one neighborhood, and the at least one neighborhood belonging to a community of end-users.

According to an embodiment of the present disclosure, the artificial intelligence (AI) capable compute unit and the smart module is configured to provide customization of the plurality of smart nodes based on data usage patterns of corresponding at least one neighborhood, and thereby facilitating a dynamic edge network distribution and delivering personalized Internet experience to respective end-users.

According to an embodiment of the present disclosure, the enclosure of the apparatus is provided with temperature management unit for providing protection to the apparatus from damage due to adverse temperature conditions.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings:

Like reference numerals refer to like parts throughout the description of several views of the drawings.

DETAILED DESCRIPTION OF THE INVENTION

Figure 1:
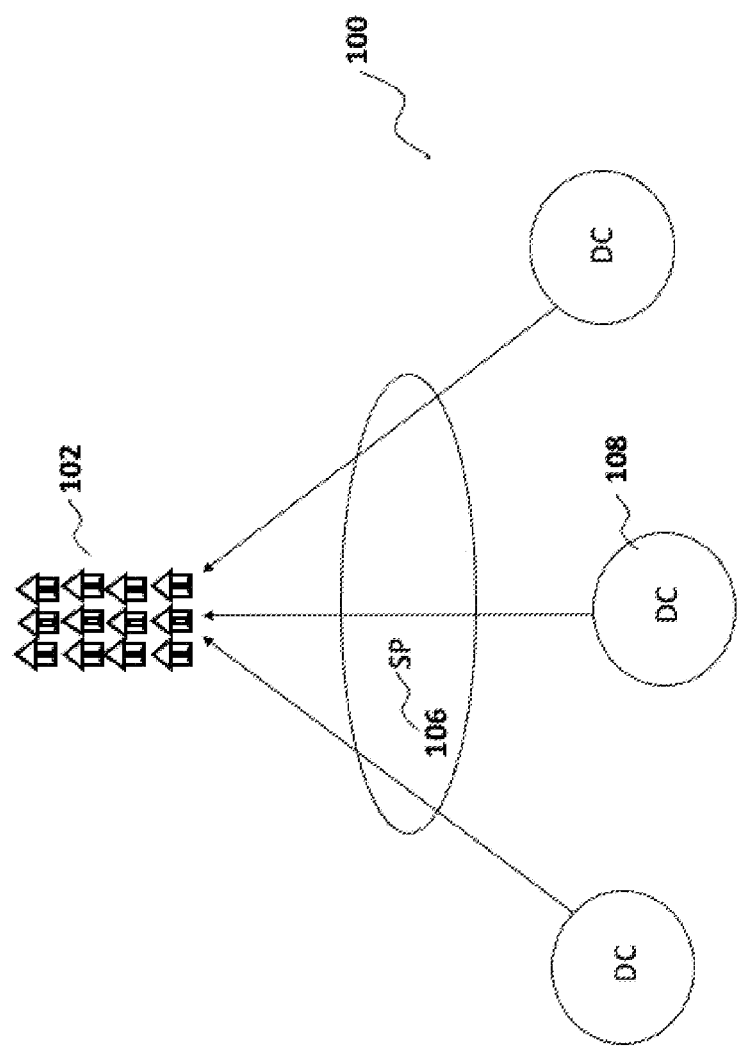
FIG. 1 (Prior Art) illustrates architecture of a traditional centralized broadband network.

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The present invention relates to implementation of an intelligent wireless broadband network and content delivery management. A broadband network architecture including at least one datacenter at least one network tower and a plurality of smart nodes are disclosed. Each of the plurality of smart nodes may be deployed as a micro point of presence (micro POP) at the at least one datacenter, at the at least one tower and at each of a plurality of hub-homes within the network. An artificial intelligence (AI) capable compute unit along with other hardware and software components may be configured together to provide customization of the plurality of smart nodes based on usage pattern of the plurality of homes at a neighborhood level, and thereby facilitating a dynamic edge network distribution solution for delivering personalized Internet experience to respective end-users.

As used herein, 'hub-home' is a commercial or residential building located in an area where a customer premise equipment (CPE) may be installed for providing network connections.

As used herein, 'point of presence' (POP) is an access point at a physical location for connecting two or more network devices.

As used herein, 'datacentre' is a dedicated space to accommodate a plurality of computer systems, storage devices, servers, routers, network switches and other associated devices or components that are necessary in the processes of a typical telecommunication network, such as transportation of network data traffic from a server to the consumer premise equipment.

As used herein, 'user device' is a smart electronic device capable of communicating with various other electronic devices and applications via one or more communication networks. Examples of said user device include, but not limited to, a wireless communication device, a smart phone, a tablet, a desktop, etcetera. The user device comprises: an input unit to receive one or more input data; an operating system to enable the user device to operate; a processor to process various data and information; a memory unit to store initial data, intermediary data and final data; and an output unit.

As used herein, 'module' or 'unit' refers to a device, a system, a hardware, a computer application configured to execute specific functions or instructions according to the embodiments of the present invention. The module or unit may include a single device or multiple devices configured to perform specific functions according to the present invention disclosed herein.

Terms such as 'connect', 'integrate', 'configure', and other similar terms include a physical connection, a wireless connection, a logical connection or a combination of such connections including electrical, optical, RF, infrared, or other transmission media, and include configuration of software applications to execute computer program instructions, as specific to the presently disclosed embodiments, or as may be obvious to a person skilled in the art.

Terms such as 'send', 'transfer', 'transmit' and 'receive', 'collect', 'obtain', 'access' and other similar terms refers to transmission of data between various modules and units via wired or wireless connections across a communication network.

Figure 2:
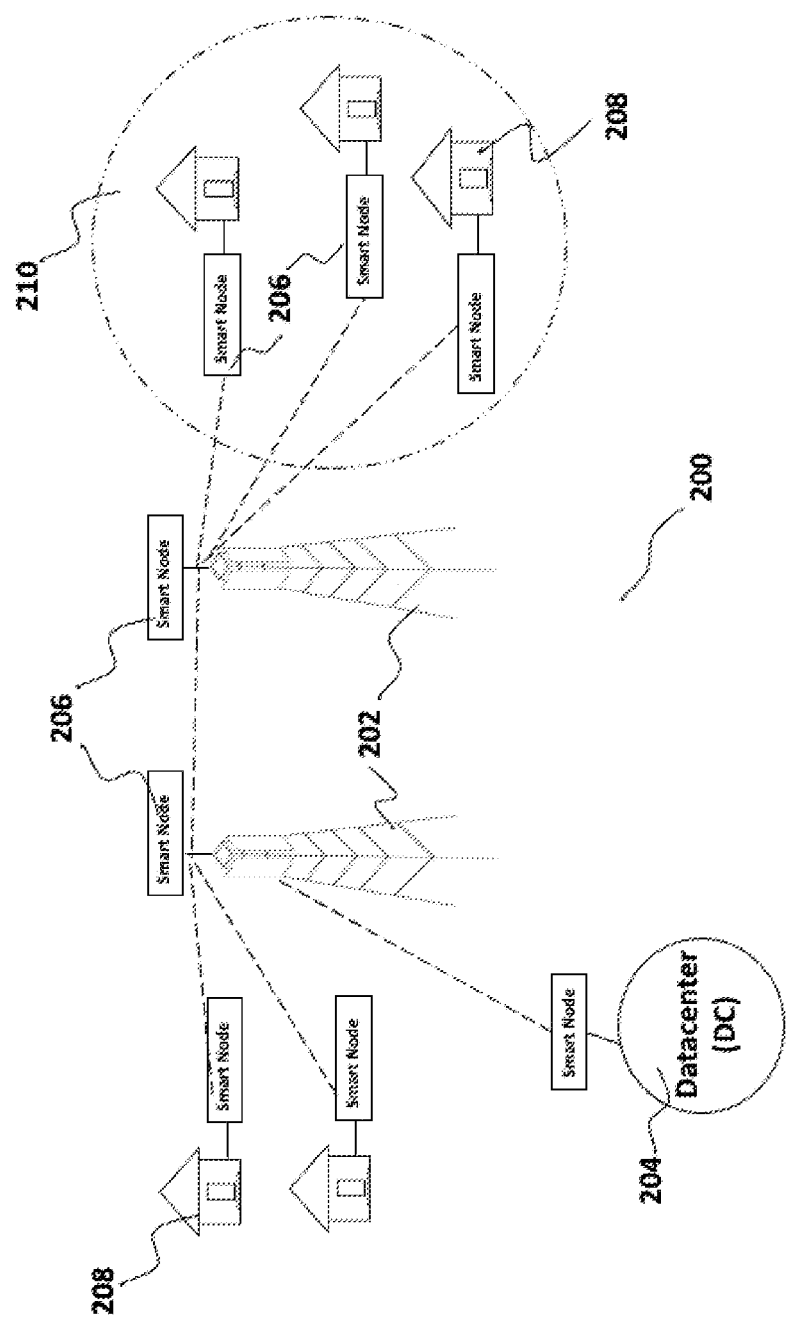
FIG. 2 illustrates architecture of a broadband network system, according to an exemplary embodiment of the invention.

FIG. 2 illustrates architecture of a decentralized broadband network system 200, according to an exemplary embodiment of the present invention. The system 200 comprises at least one network tower 202, at least one datacenter 204, and a plurality of smart nodes 206. Each of the plurality of smart nodes 206 is an intelligent network node and has the capability to make decision of its own, wherein the decision may be different to other nodes' decisions. Each of the plurality of smart nodes 206 is deployed as a micro point of presence (micro POP) at the at least one tower 202, and at the at least one datacenter 204. The smart nodes 206 are also deployed at each of a plurality of hub-homes 208. The plurality of hub-homes 208 within an area or locality makes a neighborhood. Each of the plurality of hub-homes 208 therefore belongs to at least one neighborhood 210. One or more neighborhood 210 consisting of hub-homes 208 may belong to a community 302 (illustrated in FIG. 3) of end-users. Fixing or installing the smart nodes 206 at each hub-home, the network tower 202 and the datacenter 204 provides the end-user the experience of customization based on their localized needs. The broadband network system 200 therefore facilitates in providing micro edge deployment of the smart nodes 206 at the hub-homes 208 for the end-users. This further facilitates in providing from service providers 304 (illustrated in FIG. 3) to the end-users, a unique client experience, as compared to the traditional edge computing solutions of the traditional centralized broadband architecture 100.

According to an embodiment of the present disclosure, the end users may use smart user devices to connect to the network system 200 and access the various available contents being delivered by the one or more service providers. For example, the end-users may subscribe various service providers to connect to the Internet and access the content. The end users may use smart phones, tablets, laptops, television sets and other user devices capable of connecting to the network system 200.

Figure 4:
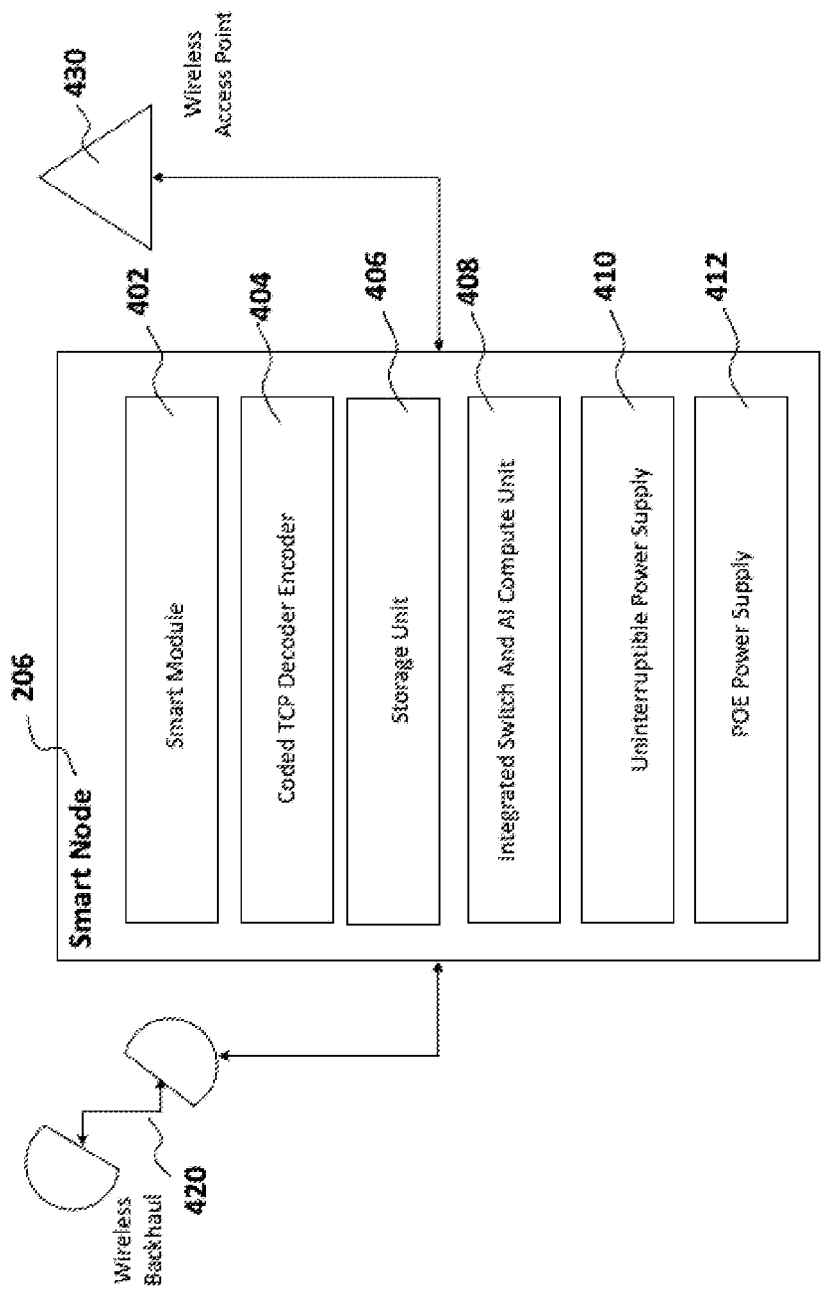
FIG. 4 illustrates components of a smart node, according to an exemplary embodiment of the present invention.

Each of the plurality of smart nodes 206 is configured to integrate one or more components including an artificial intelligence (AI) capable compute and a smart module 402 (illustrated in FIG. 4). The artificial intelligence (AI) capable compute unit 408 (illustrated in FIG. 4) and the smart module 402 are configured to provide customization of the plurality of smart nodes 206 based on usage pattern of corresponding at least one neighborhood 210. For example, if in a neighborhood or locality, any particular genre of movies or TV shows is popular amongst the users/viewers, then the smart nodes installed at that particular neighborhood is capable to identify the same and accordingly will customize the data traffic flow to provide popular content on edge for the end-users. The AI capable compute unit 408 and the smart module 402 of the smart nodes decentralizes edge network distribution and facilitate in providing preferred content from the at least one datacenter 204 to the end-users of the corresponding at least one neighborhood 210. This further provides a personalized Internet experience to the end-users.

The smart nodes 206 may be installed at the outside of the hub-home 208 to provide line of sight network connectivity. In one embodiment of the present disclosure, the at least one neighborhood 210 may include <50 hub-homes 208. The neighborhood 210 is therefore a small area with small number of hub-homes 208 sending and receiving small data that is relatively easy to manage. One or more neighborhood 210 may combine as a community 302 of hub-homes 208 or end-users. In one embodiment herein, a community 302 may include <100 hub-homes 208. The smart nodes 206 is capable to perform deep packet inspection (DPI) at a neighborhood 210 level for less than 50 homes, for example. The DPI inspection process of the data may include detail inspection of data being sent over the neighborhood 210 level. Subsequently, actions may be taken such as alerting, notifying, blocking, changing the route of the traffic etcetera.

In one embodiment of the present invention, the DPI process may also be carried at the community 302 level. The smart node 206 is configured to identify small data at the neighborhood 210 level and large data at the community 302 level. The broadband network system 200 is capable of identifying large and small volume of data flow at community 302 level and neighborhood 210 level respectively. Therefore, the smart nodes 206 as configured in the broadband network, function as an observer as well as a decision maker. This makes the broadband network system 200 as an intelligent network having proactive/reactive capabilities. The proactive capabilities of the broadband network include making updates in real-time, identifying and preventing virus traffic, identifying theft, providing high-speed CDN services. Thus, over-the-air (OTA) updates is possible in the network by installing the smart nodes 206 in the network. The pro-active capabilities of the smart nodes 206 as deployed in the broadband network 200 facilitates in saving a large amount of bandwidth. It also facilitates in high-speed data flow and high-speed content delivery.

Figure 3:
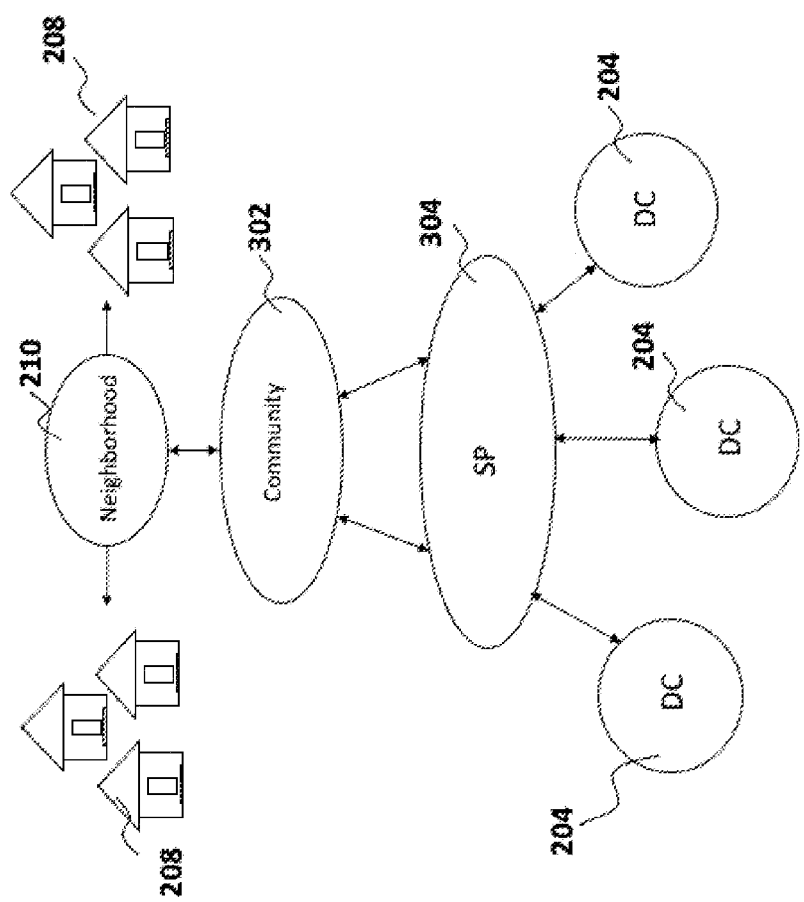
FIG. 3 illustrates features of a decentralized broadband network system, according to an exemplary embodiment of the present invention.

FIG. 3 illustrates decentralization feature of the broadband network system 200, according to an exemplary embodiment of the present invention. As explained above, the neighborhood 210 includes the plurality of hub-homes 208 wherein each hub-home 208 has a smart node 206 installed on the outside of the hub-home 208. At the community 302 level, there may be more number of hub-homes 208 as compared to the neighborhood 210 level. The smart node 206 comprises one or more components including the AI compute 408 that facilitates in identifying the data at the neighborhood 210 level and also at the community 302 level. Further, as illustrated in the figure, the broadband network 200 is capable of providing a two-way network information flow between at least one datacenter 204 and the plurality of hub-homes 208. The smart node 206 is also provided with heat management unit which enables the smart node 206 equipment to withstand the heat as it is installed outside and exposed to the varying environment temperature.

The deployment of a plurality of smart nodes 206 as a micro POP at each hub-home 208 and each tower 202 and each datacentre, facilitate in providing an effective, intelligent edge distribution that offers a substantially different user experience. As explained above, the plurality of smart nodes 206 are capable of performing the deep packet inspection. This allows the plurality of smart nodes 206 to analyse usage patterns of a particular neighborhood 210. Through the analysis of usage patterns via the deep packet inspection at a neighborhood 210 level, it becomes possible for the network to identify the requirements and take response actions, thus providing a bi-directional flow of data in the network between the datacenters and the hub-homes 208. For example, the smart nodes 206 installed at the hub-homes 208 facilitate the service providers 304 to make real time updates, change the traffic route, provide customized content to the end-users based on popularity of a content within a particular neighborhood 210 etcetera.

The decentralized architecture of the network 200 allows for multiple redundancy within network as compared to the conventional architecture 100 having single point of failure. The presence of smart nodes 206 at each level provides redundancy in the network 200. If one node fails, it does not case failure of the entire system. The decentralized network 200 is therefore a reliable network in the emergency situation such outage due natural crisis, technical breakdown etcetera. Further, the redundant nodes also allow better resource distribution and bandwidth management.

FIG. 4 illustrates components of a smart node 206, according to an exemplary embodiment of the present invention. The smart node 206 components are integrated hardware and software components that are enclosed together in an enclosure. The enclosure is made up of hard and robust materials that can withstand the environmental changes, wear-and-tear over the time, extreme weather conditions etcetera. A thermal insulation may be provided at the inside of the enclosure to protect the components from adverse temperatures. The enclosure is thus an effective and reliable enclosure that is suitable for outdoor installation purposes.

In one embodiment of the present disclosure, the one or more components of the smart node 206 include the smart module 402, a coded TCP encoder-decoder 404, a storage unit 406, the AI capable compute unit 408 which also has an integrated switch, a UPS (uninterruptible power supply) 410 and a power over Ethernet (POE) power supply 412. The smart nodes 206 may be configured by using one or more combinations of the hardware and software components. The backhaul data traffic 420 is received by the smart node 206 via the network tower access points. The received data traffic is provided to the TCP encoder-decoder 404 for necessary data encryption and decryption and delivered to the user devices via wireless access points 430.

The smart module 402 includes an intelligent content and service engine. The smart module 402 may be a software application that is configured by using technologies like deep learning technology and Blockchain technology. The smart module 402 dynamically identifies user preferences, content popularity and accordingly facilitates in pushing the content closer to the end-user. With micro deployment of the smart nodes 206 at every hub-homes 208, the contents can be made available on the edge of the network. In one embodiment of the present disclosure, the smart module 402 also provides the capability of identifying and calculating number of views, likes, reviews, ratings and comments for a particular show, video, movie, or any other content. The machine learning and deep learning techniques may be applied to predict content popularity and accordingly the content may be made available near to the end-user in a particular neighborhood 210. The intelligent content and service engine of the smart module 402, thus provides customization based on usage pattern to identify and deliver relevant content for the edge network. Accordingly, based on different data packets and neighborhoods 210, each smart node 206 is capable of identifying or detecting the different and dynamic data usage pattern that is relevant to respective end-users. Therefore, different data usage patterns may be identified dynamically by the smart node 206. The intelligent content and service engine of the smart module 402, may also be configured to analyse historical data to detect the data patterns.

The coded TCP encoder decoder 404 is a network level encoder and decoder 404. This component handles data compression and different necessary network protocols.

The storage unit 406 is configured to provide a dynamic storage management for the content delivery and edge network distribution. According to the embodiments of the present disclosure, the storage unit 406 via the smart node 206 is moved to the end-users' premises at a neighborhood 210 level. The storage unit 406, being closer to the end-user, i.e., at the neighborhood 210 level, facilitates the content service providers 304 to display the content to their users, at a much faster speed as compared to the traditional centralized ISP network architecture 100. The storage unit 406 is configured as a highly secure and encrypted data storage along with other components of the smart node 206. The installation of smart nodes 206 at plurality of locations provides the storage unit 406 across the network 200 for various consumers and enterprises.

In one embodiment of the present disclosure, the storage unit 406 is configured as edge cache, which may be specific to the end-users' requirements. The storage unit 406 may have limited storage capacity and therefore may only save the content that are relevant to the edge users. As the preferences and data usage patterns within a neighborhood 210 level or a community 302 level keep changing, the smart node 206 may accordingly make appropriate caching decisions to store the content or associated links for the end-users.

The Integrated Switch and AI Compute unit 408 utilizes a customized, learning neural network, for distributing content closer to the end-user thereby providing a high-speed content delivery and low latency. The AI compute unit 408 comprises GPUs (Graphics Processing Units) and TPUs (Tensor Processing Units) and is capable of performing continuous analysis on data traffic to identify the data usage pattern dynamically for corresponding neighborhood 210. Based on the analysis, provides improvement in the content delivery management and accordingly creates a chain reaction for improved user experience and efficiency across the network. Each AI-enabled edge compute device enables the pattern recognition necessary to deliver relevant content to the edge.

The TPUs and GPUs are capable of performing deep learning tasks. In the embodiments of the present disclosure, the TPUs are configured to perform large tensor operations. The TPUs and GPUs have various components including arithmetic logic units (ALUs), control units, and memory caches that facilitate in performing larger amounts of graphical, mathematical, geometrical and logical operations. The TPUs provide multi-dimensional arrays or matrices that can hold data points such as weights of a node in a neural network and handle large number of operations per second, thus enabling high speed content delivery by the smart nodes 206.

The un-interruptible power supply (UPS) 410 and the Power Over Ethernet (POE) power supply 412 are configured to provide a continuous supply of power to the smart node 206 apparatus for enabling its uninterruptible operation in the event of any power failure or breakdown.

Figure 5:
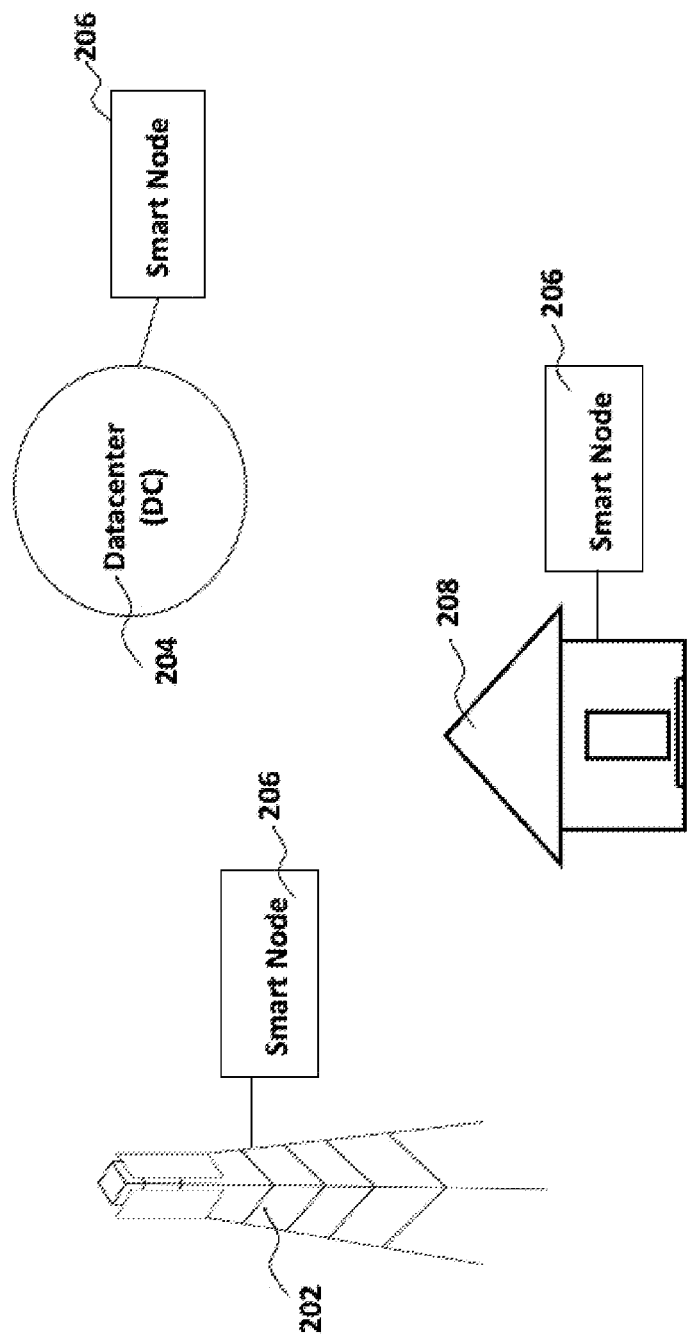
FIG. 5 illustrates deployment of the smart node at a hub-home, at a tower, and at a datacenter, according to an exemplary embodiment of the invention.

FIG. 5 illustrates deployment of the smart node 206 at a hub-home 208, at a tower 202, and at a datacenter 204, according to an exemplary embodiment of the invention. As shown in the figure, the intelligent smart node 206 is installed at various locations to ensure the decentralized operation of the network 200. The smart node 206 is installed at each of the hub-homes 208, network towers 202 and the datacenters 204 to enable dynamic edge network distribution. Through the use of smart nodes 206, microservices and virtualization of the network at the neighborhood levels is carried out. This in turn helps in saving costs on bandwidths and resources. Due to the micro-services and virtualization of the network, the content is cached and cycled on the edge dynamically according to the needs of the end-user. Accordingly, the Content Distribution Network (CDN) operators or content providers provide better quality and experience to their subscribers.

Figure 6:
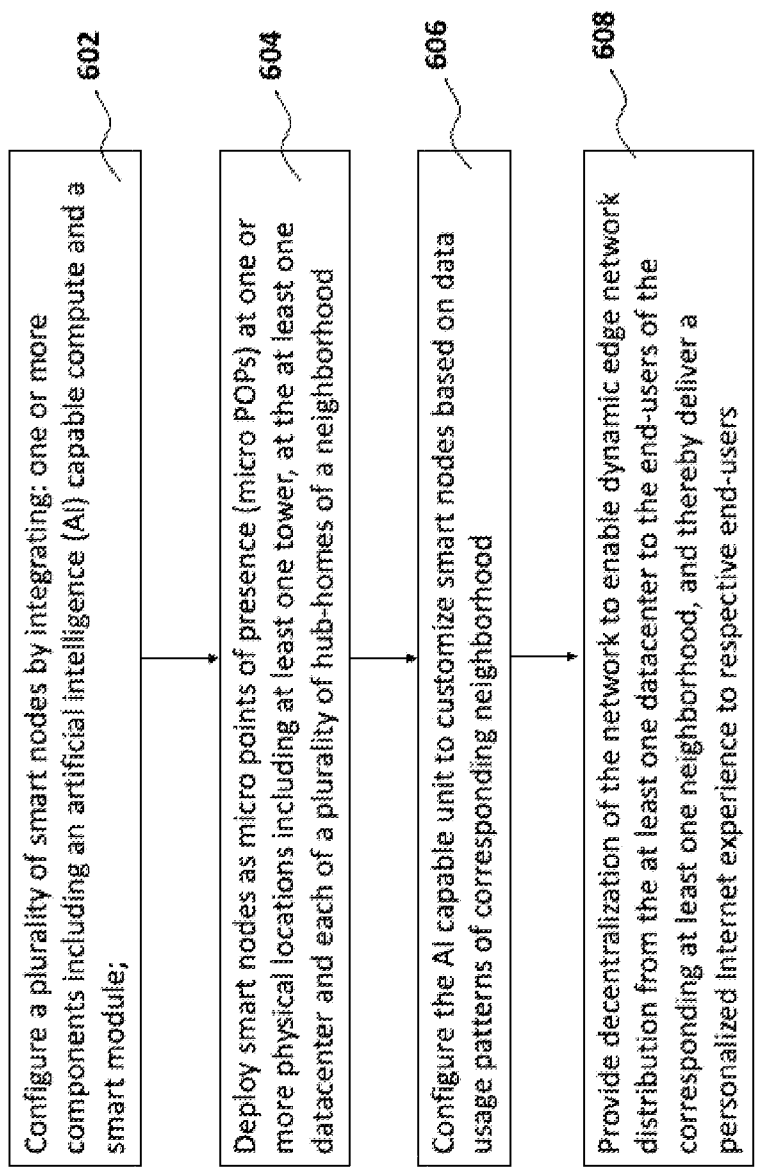
FIG. 6 illustrates a method for implementing a decentralized broadband network system, according to an exemplary embodiment of the present invention.

FIG. 6 illustrates a method for implementing a decentralized broadband network system, according to an exemplary embodiment of the present invention.

At step 602 at least one network tower 202 and at least one datacenter 204 may be configured. Further, a plurality of smart nodes 206 is provided wherein each smart node is configured by integrating: one or more components including an artificial intelligence (AI) capable compute and a smart module 402. The smart node 206 components are hardware and software components that are integrated and enclosed together in an enclosure. The enclosure may be manufactured by using hard materials to withstand the environmental adverse weather and wear-and-tear over the time. The enclosure may also be provided a thermal insulation to protect the one or more components from extreme temperature conditions.

At step 604, each of the smart nodes 206 is deployed as a micro point of presence (micro POP) at the at least one network tower 202, at the at least one datacenter 204 and at each of a plurality of hub-homes 208. The plurality of hub-homes 208 within an area or locality belong to a neighborhood 210. One or more neighborhood 210 consisting of hub-homes 208 further belong to a community 302 of end-users. Installation of smart nodes 206 at each hub-home 208, within a neighborhood 210 and within a community 302 enables de-centralization of the broadband network. It further provides better management of the network resources at a reduced cost.

At step 606, the AI capable unit is configured to customize the smart nodes 206 based on respective data usage patterns of corresponding neighborhood 210. The customization of the smart nodes 206 based on the user's needs facilitates in providing micro edge deployment at the hub-homes 208 for the end-users. This further facilitates in providing from service providers 304 to the end-users, a unique client experience, as compared to the traditional edge computing solutions.

At step 608, the AI capable compute unit 408 is configured for providing customization of the plurality of smart nodes 206 based on usage pattern of corresponding at least one neighborhood 210. The AI capable compute unit 408 and the smart module 402 is further configured to decentralize edge network distribution from the at least one datacenter 204 to the end-users of the corresponding at least one neighborhood 210, and thereby facilitating a dynamic edge network distribution and delivering personalized Internet experience to respective end-users.

Thus, the embodiments of the present disclosure provide fixed wireless network architecture capable of processing advance edge compute applications, and smartCDN capabilities. The smart nodes 206 provides capabilities of AI-Driven Intelligent Content Delivery to the network. By providing decentralized broadband network, there is more effective utilization of existing bandwidth. Moreover, the broadband network architecture according to the embodiments disclosed herein, ensures an infrastructure that is capable of supporting Next Generation of Devices/IoT. Further, the network architecture provides an ability to the end-users to access ISP resources at edge.

The smart nodes 206 deliver more bandwidth to a neighborhood and low-medium density of homes than prior solutions. The smart nodes 206 enhance available wireless bandwidth, optimized TCP, and content delivery to deliver content with lower latency and true on-demand functionality. The smart nodes 206 provide personalized connectivity at the granularity of small number of homes at a time, for example, 20-50 homes at a time.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What claimed is:

1. A broadband network system comprising:
   at least one network tower;
   at least one datacenter; and
   a plurality of smart nodes, each smart node configured to integrate one or more components including an artificial intelligence (AI) capable compute unit and a smart module;
   wherein each smart node is deployed as a micro point of presence (micro POP) at:
   the at least one tower,
   the at least one datacenter, and
   each of a plurality of hub-homes, the plurality of hub-homes belonging to at least one neighborhood, the at least one neighborhood belonging to a community of end-users,
   and wherein the artificial intelligence (AI) capable compute unit and the smart module are configured to:
   provide customization of the plurality of smart nodes based on usage pattern of corresponding at least one neighborhood,
   decentralize edge network distribution from the at least one datacenter to the end-users of the corresponding at least one neighborhood, and thereby
   deliver personalized Internet experience to the end-users;
   wherein each smart node is configured to provide a two-way network information flow between the at least one datacenter and the plurality of hub-homes.

2. The system of claim 1, wherein the broadband network is a decentralized wireless broadband network providing multiple redundancy within the network via the micro POPs.

3. The system of claim 1, wherein the smart module comprises a decoder, an encoder, an intelligent content and service engine.

4. The system of claim 1, wherein the broadband network is capable of identifying large and small volume of data flow at community level and neighborhood level respectively.

5. The system of claim 1, wherein the deployment of each smart node at the at least one tower, at the at least one datacenter and at each of a plurality of hub-homes, facilitates in providing more capacity, lower latency, and content optimization and personalization to the end-users.

6. The system of claim 1, wherein the one or more components of the smart node further include a storage unit, a decoder encoder unit, an un-interruptible power supply (UPS) and a Power Over Ethernet (POE) power supply.

7. The system of claim 6, wherein the storage unit stores relevant content for facilitating customized and personalized services to the end-users.

8. A method for providing a broadband network, the method comprising:
   configuring at least one network tower;
   configuring at least one datacenter;
   configuring a plurality of smart nodes, each smart node is configured by integrating:
   one or more components including an artificial intelligence (AI) capable compute unit and a smart module;
   deploying each smart node as a micro point of presence (micro POP) at the at least one tower, at the at least one datacenter and at each of a plurality of hub-homes, the plurality of hub-homes belonging to at least one neighborhood, the at least one neighborhood belonging to a community of end-users;
   configuring the artificial intelligence (AI) capable compute unit for:
   providing customization of the plurality of smart nodes based on usage pattern of corresponding at least one neighborhood,
   decentralizing edge network distribution from the at least one datacenter to the end-users of the corresponding at least one neighborhood, and thereby
   facilitating a dynamic edge network distribution and delivering personalized Internet experience to respective end-users;
   wherein each smart node is configured to provide a two-way network information flow between the at least one datacenter and the network.

9. The method of claim 8, wherein the broadband network is a decentralized wireless broadband network providing multiple redundancy within the network via the micro POPs.

10. The method of claim 8, further comprising the step of configuring the smart module by deploying a decoder, an encoder, an intelligent content and service engine.

11. The method of claim 8, further comprising the step of identifying large and small volume of data flow at community level and neighborhood level respectively.

12. The method of claim 8, wherein the step of deploying each smart node at the at least one tower and at each of a plurality of hub-homes facilitates in providing more capacity, lower latency, and content optimization and personalization to the end-users.

13. The method of claim 8, further comprising the step of configuring the smart node by integrating a storage unit, a decoder encoder unit, an un-interruptible power supply (UPS) and a Power Over Ethernet (POE) power supply.

14. The method of claim 13, further comprising the step of storing in the storage unit, relevant content for facilitating customized and personalized services to the end-users.

* * * * *